US011335090B2

(12) United States Patent
Sydorenko et al.

(10) Patent No.: US 11,335,090 B2
(45) Date of Patent: May 17, 2022

(54) ELECTRONIC DEVICE AND METHOD FOR PROVIDING FUNCTION BY USING CORNEAL IMAGE IN ELECTRONIC DEVICE

(71) Applicant: SAMSUNG ELECTRONICS CO., LTD., Suwon-si (KR)

(72) Inventors: Dmitry Sydorenko, Kyiv (UA); Roman Kushnirenko, Oleksandriya (UA); Svitlana Alkhimova, Kyiv (UA); Andrii Bogachenko, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/903,624

(22) Filed: Jun. 17, 2020

(65) Prior Publication Data

US 2020/0394408 A1    Dec. 17, 2020

(30) Foreign Application Priority Data

Jun. 17, 2019    (KR) .......................... 10-2019-0071699

(51) Int. Cl.
*G06K 9/00*    (2022.01)
*G06F 3/01*    (2006.01)
(Continued)

(52) U.S. Cl.
CPC .............. *G06V 20/20* (2022.01); *G06F 3/013* (2013.01); *G06T 1/0007* (2013.01); *G06V 40/19* (2022.01); *H04N 5/23219* (2013.01)

(58) Field of Classification Search
None
See application file for complete search history.

(56) References Cited

U.S. PATENT DOCUMENTS 8,898,496 B1 *  11/2014  Chi ........................ G06F 1/3231
                                                        713/323
9,646,522 B2 *  5/2017  Ratcliff ............... G06F 3/04815
(Continued)

FOREIGN PATENT DOCUMENTS

KR    10-2017-0059344 A    5/2017
KR    10-2017-0112885 A    10/2017
WO       2017/195034 A1    11/2017

OTHER PUBLICATIONS

Jenkins, Rob et al., "Indentifiable Images of Bystanders Extracted from Corneal Reflections", PLOS ONE, Dec. 26, 2013, vol. 8, Issue 12, e83325. (5 pages total).

(Continued)

*Primary Examiner* — Edemio Navas, Jr.
(74) *Attorney, Agent, or Firm* — Sughrue Mion, PLLC

(57) ABSTRACT

An electronic device includes a camera; a display; a memory; and a processor configured to be operatively connected to the camera, the display, and the memory, wherein the memory is configured to store instructions that, when executed, cause the processor to: receive image data including a first image, acquired by the camera, of at least a part of a user's body; extract a corneal region of an eye from the image data; acquire surrounding information formed in the extracted corneal region; recognize at least one object in the surrounding information; and provide, on the display, a visual feedback corresponding to the recognized at least one object.

20 Claims, 18 Drawing Sheets

(51) Int. Cl.
*G06T 1/00* (2006.01)
*H04N 5/232* (2006.01)
*G06V 20/20* (2022.01)
*G06V 40/19* (2022.01)

(56) References Cited

U.S. PATENT DOCUMENTS

| | | | |
|---|---|---|---|
| 9,740,284 B2 | 8/2017 | Sullivan et al. | |
| 9,965,999 B1* | 5/2018 | Barnes | G09G 3/3413 |
| 10,284,817 B2* | 5/2019 | Lawrenson | G02B 17/08 |
| 2012/0215403 A1* | 8/2012 | Tengler | B60K 37/06 |
| | | | 701/36 |
| 2015/0160461 A1* | 6/2015 | Starner | G06F 3/013 |
| | | | 345/156 |
| 2016/0302662 A1 | 10/2016 | Suzuki et al. | |
| 2017/0064212 A1 | 3/2017 | Wexler et al. | |
| 2017/0285741 A1 | 10/2017 | Park et al. | |
| 2017/0323159 A1 | 11/2017 | Cohen | |
| 2018/0007276 A1* | 1/2018 | Ollila | G08B 21/02 |
| 2019/0122046 A1* | 4/2019 | Wantland | G06K 9/00671 |
| 2019/0130297 A1* | 5/2019 | Linden | A61B 3/113 |
| 2020/0342668 A1* | 10/2020 | Chojnacka | G06K 9/6201 |

OTHER PUBLICATIONS

International Search Report (PCT/ISA/210) dated Sep. 28, 2020 by the International Searching Authority in counterpart International Patent Application No. PCT/KR2020/007427.

* cited by examiner

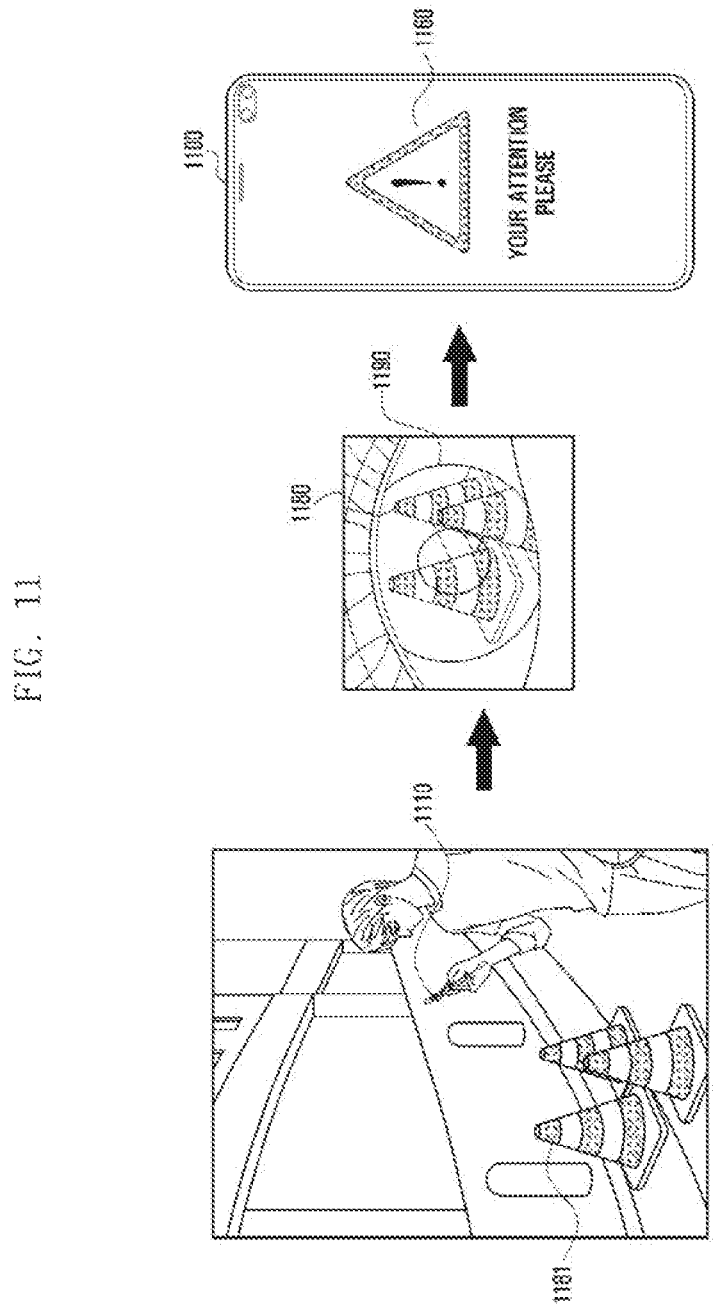

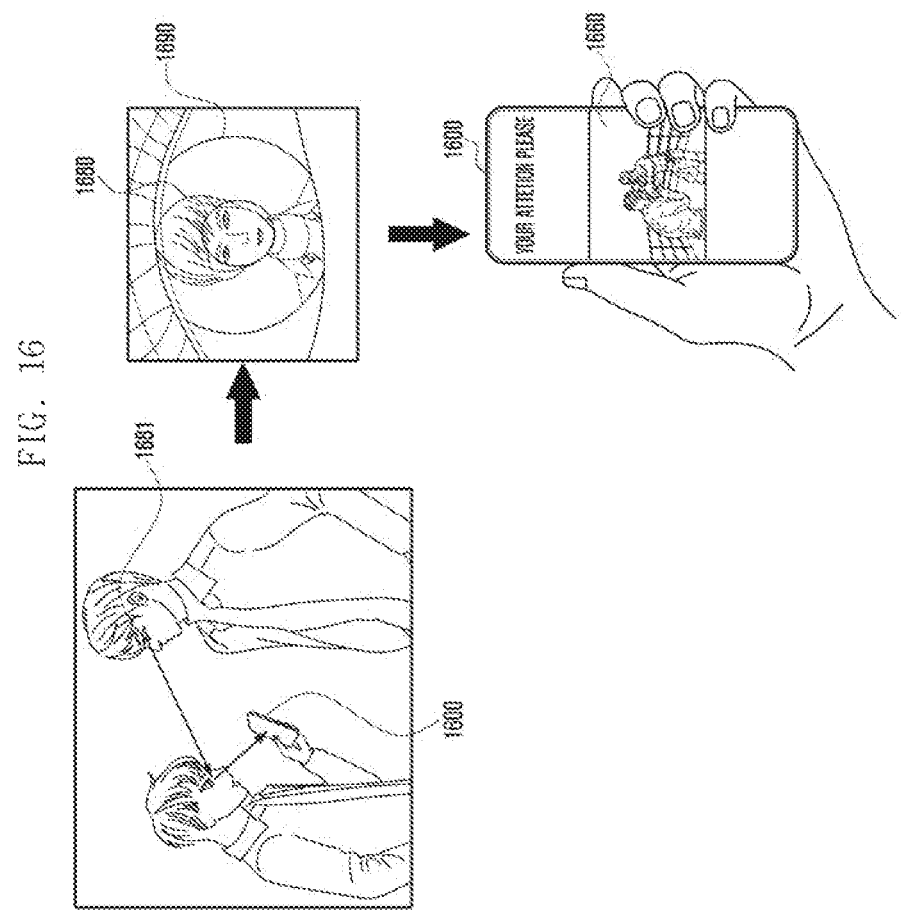

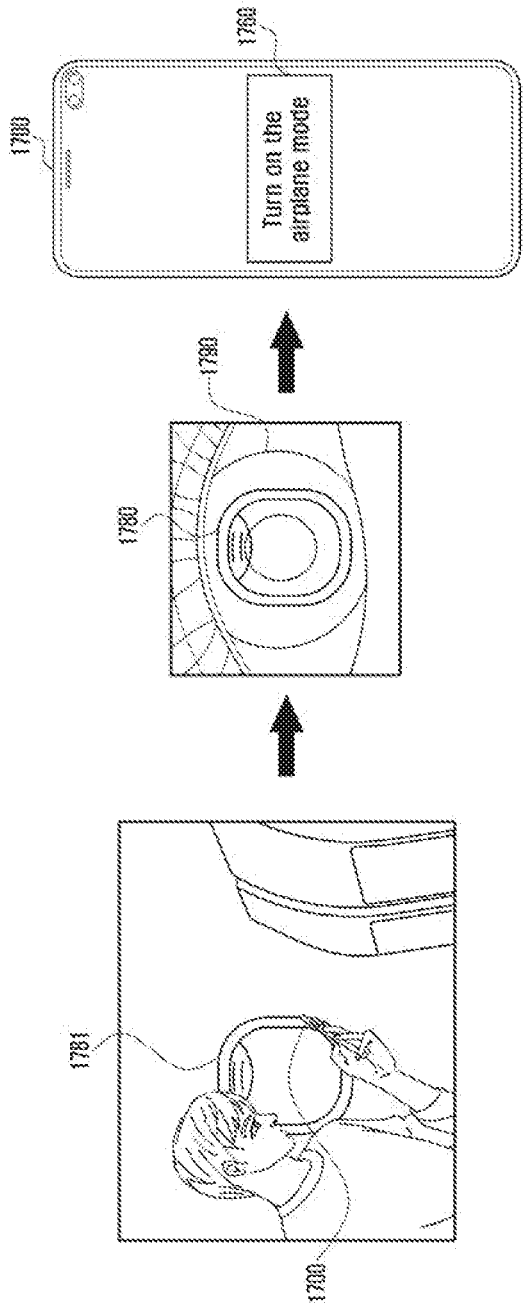

ELECTRONIC DEVICE AND METHOD FOR PROVIDING FUNCTION BY USING CORNEAL IMAGE IN ELECTRONIC DEVICE

CROSS-REFERENCE TO RELATED APPLICATION

This application is based on and claims priority under 35 U.S.C. § 119 to Korean Patent Application No. 10-2019-0071699, filed on Jun. 17, 2019, in the Korean Intellectual Property Office, the disclosure of which is incorporated by reference herein in its entirety.

BACKGROUND

1) Field

The disclosure relates to an electronic device and, more specifically, to a method for an electronic device capable of capturing image data by using a camera, extracting, from the acquired image data, a region reflected from a user's eye, and providing various functions by using the extracted region.

2) Description of Related Art

With the advancement of mobile communication technology and processor technology, a portable terminal device (hereinafter, "electronic device") allows implementation of various applications beyond a conventional telephone call function. For example, various applications, including Internet browsers, games, multimedia, and the like, have been developed and have been utilized in an electronic device.

For portability, an electronic device must have a limited size, and thus it is difficult to enlarge a display thereof on which a screen of an application is displayed. Accordingly, a user needs to stare at the small display in order to use functions of the electronic device.

The user may use the electronic device in various situations while the user moves, has a meal, or has a meeting. In these situations, the user stares at the electronic device, and thus may fail to recognize much surrounding information.

The above information is presented as background information only to assist with an understanding of the disclosure. No determination has been made, and no assertion is made, as to whether any of the above might be applicable as prior art with regard to the disclosure.

SUMMARY

When a user stares at an electronic device, it is necessary to provide the user with information on a surrounding environment.

An aspect of the disclosure is to provide an electronic device capable of acquiring an image formed on a user's cornea by using a camera thereof and providing various functions by using the acquired image, and a method for providing a function by the electronic device.

In accordance with an aspect of the disclosure, an electronic device includes a camera; a display; a memory; and a processor configured to be operatively connected to the camera, the display, and the memory, wherein the memory is configured to store instructions that, when executed, cause the processor to receive image data including a first image, acquired by the camera, of at least a part of a body of a user; extract a corneal region of an eye from the image data; acquire surrounding information formed in the extracted corneal region; recognize at least one object in the surrounding information; and provide, on the display, a visual feedback corresponding to the recognized at least one object.

The instructions, when executed, may further cause the processor to display, on the display, a second image of the recognized at least one object or a predetermined image.

The instructions, when executed, may further cause the processor to provide, as the visual feedback, an alarm for danger recognition, when the recognized at least one object corresponds to a predetermined type of object.

The electronic device may further include a sensor configured to measure a movement speed of the electronic device, wherein the instructions, when executed, further cause the processor to provide the alarm for the danger recognition, when the movement speed measured by the sensor is greater than or equal to a predetermined speed.

The instructions, when executed, may further cause the processor to acquire location information of the electronic device based on the recognized at least one object; and provide the acquired location information to an executed location-based application.

The instructions, when executed, may further cause the processor to display an augmented reality content on the display; and display the visual feedback in the augmented reality content.

The instructions, when executed, may further cause the processor to acquire an ambient brightness from the surrounding information.

The instructions, when executed, may further cause the processor to recognize at least one text in the surrounding information; and provide information related to the at least one text.

The camera may be disposed on a front surface of a housing of the electronic device.

The extracted corneal region may be of at least one eye of the user.

The instructions, when executed, may further cause the processor to detect an eye-gaze position of the user from the image data; and provide the visual feedback when the eye-gaze position is directed to at least a part of the electronic device.

In accordance with an aspect of the disclosure, a method for providing a function by an electronic device includes acquiring image data including a first image, acquired using a camera, of at least a part of a body of a user; extracting a corneal region of an eye from the image data; acquiring surrounding information formed in the extracted corneal region; recognizing at least one object in the surrounding information; and providing, on a display, a visual feedback corresponding to the recognized at least one object.

The providing of the visual feedback may include displaying, on the display, at least one of a second image of the recognized at least one object and a predetermined image.

The providing of the visual feedback may include providing, as the visual feedback, an alarm for danger recognition, when the recognized at least one object corresponds to a predetermined type of object.

The method may further include measuring a movement speed of the electronic device by using a sensor, wherein the providing of the visual feedback further includes providing the alarm for the danger recognition, when the movement speed measured by the sensor is greater than or equal to a predetermined speed.

The providing of the visual feedback may include acquiring location information of the electronic device based on the recognized at least one object; and providing the acquired location information to an executed location-based application.

The acquiring of the surrounding information may include acquiring an ambient brightness from the surrounding information.

The providing of the visual feedback may include recognizing at least one text in the surrounding information; and providing information related to the at least one text.

The extracted corneal region may be of at least one eye of the user.

The method may further include detecting an eye-gaze position of the user from the image data, wherein the providing of the visual feedback includes providing the visual feedback when the eye-gaze position is directed to at least a part of the electronic device.

In accordance with an aspect of the disclosure, an electronic device includes a camera; a display; a processor; and a memory configured to store instructions that, when executed, cause the processor to receive, from the camera, a first image reflected by a first cornea of a user viewing the display, the first image including a first sub-image of a real-world object located near the user; and provide a visual feedback on the display based on the real-world object.

The visual feedback may include the first sub-image of the real-world object.

The visual feedback may include a predetermined image different from the first sub-image of the real-world object.

The visual feedback may include an alarm based on the real-world object corresponding to a predetermined type of object.

The electronic device may further include a sensor configured to measure a movement speed of the electronic device, wherein the instructions, when executed, further cause the processor to refrain from providing the visual feedback in response to the movement speed being less than a predetermined speed.

The instructions, when executed, may further cause the processor to acquire a location of the electronic device based on the real-world object.

The visual feedback may include information about the real-world object.

The first image may further include a second sub-image of a light source located near the user, wherein the instructions, when executed, further cause the processor to acquire an ambient brightness near the user based on the light source, and wherein the visual feedback comprises an augmented reality element added, based on the ambient brightness, to a displayed image of the real-world object.

The visual feedback may include information regarding a text included in the real-world object.

The instructions, when executed, may further cause the processor to receive, from the camera, a second image reflected by a second cornea of the user, the second image including the first sub-image of the real-world object; and generate a panorama image based on the first image and the second image and having a wider angle of view than angles of view of the first image and the second image.

The first image may be captured by the camera at a first time, wherein the instructions, when executed, further cause the processor to receive, from the camera, a second image reflected at a second time by the first cornea of the user, and wherein the second time is different from the first time.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 to FIG. 17 are views each illustrating an example in which an electronic device provides a user with various functions by using an image formed on a cornea.

DETAILED DESCRIPTION

Figure 1:
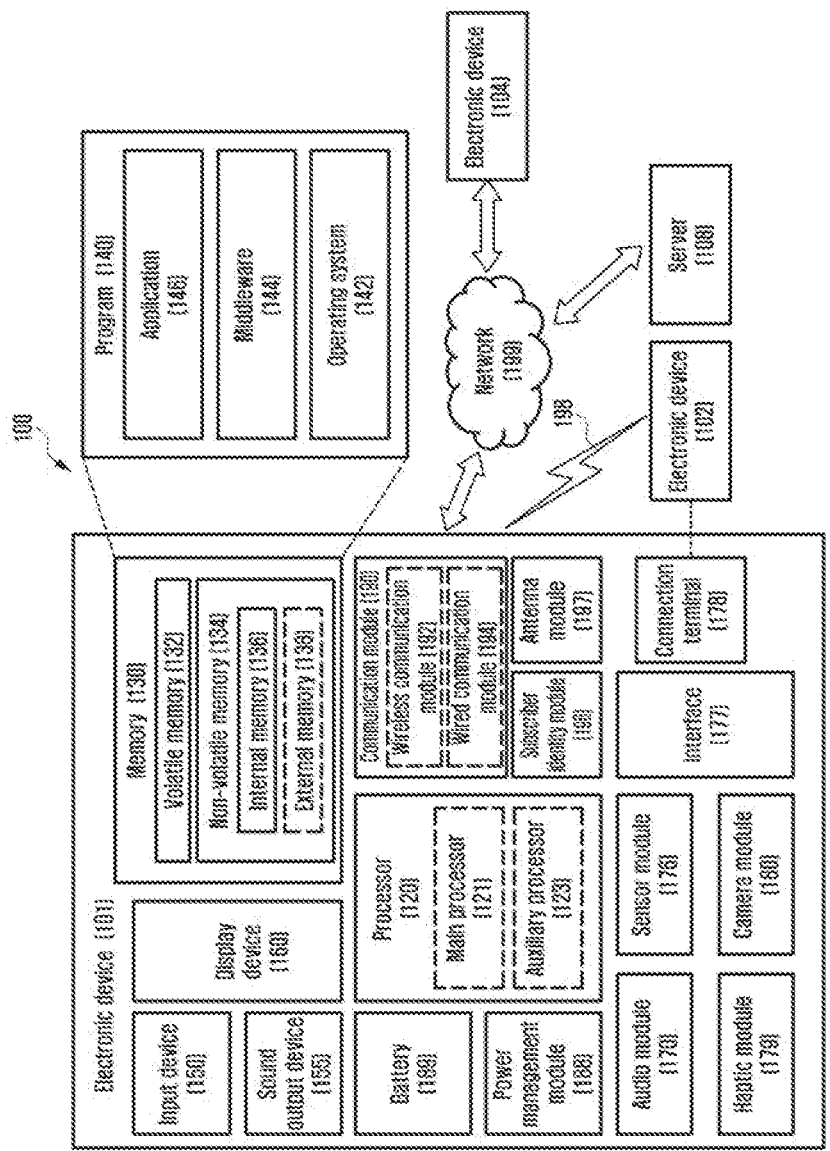
FIG. 1 is a diagram illustrating a configuration of an electronic device in a network according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS)

communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
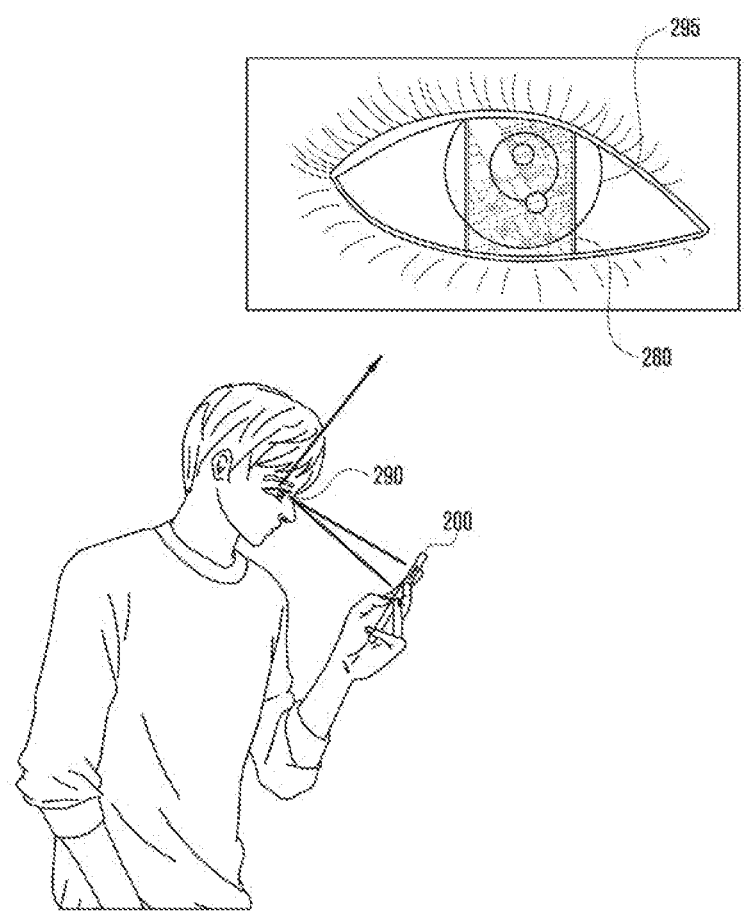
FIG. 2 is a view illustrating an example of an image formed on a user's eye when the user stares at an electronic device.

FIG. 2 is a view illustrating an example of an image formed on a user's eye when the user stares at an electronic device.

According to an embodiment, an electronic device 200 (e.g., the electronic device 101 of FIG. 1) may include a display (e.g., the display apparatus 160 of FIG. 1), and may provide a user with various functions (e.g., the Internet, games, and multimedia) on the display.

The user may stare at the display in order to identify a function provided on the display. In this situation, a viewing angle of the user may become narrower, and thus the user may not recognize a surrounding environment. For example, when the user is viewing multimedia while walking, the user may not recognize an obstacle located in a movement direction.

In an embodiment, in a situation where the user stares at the electronic device 200 as described above, it is possible to identify surrounding information, including an obstacle, a person, and the like located in front of the user, and provide an appropriate visual feedback to the user, accordingly.

A cornea (i.e., a first cornea) 295 is a transparent and avascular tissue located on the anterior surface of the eyeball, and may not only protect an eye 290 from the outside, but may also allow light to be transmitted and refracted so as to be delivered to the optic nerve. Since the cornea 295 reflects at least some of the light rays, an image of external information may be projected from the cornea 295.

Further, an image of information having an angle of view wider than a viewing angle, at which the user fixes his or her eyes, is projected from the cornea 295, and thus an image of an area, at which the user does not stare, may also be formed on the cornea 295.

According to an embodiment, it is possible to capture an image of an eye (i.e., a first image) 290 of the user who stares at the electronic device 200 by using a camera disposed on the front surface of the electronic device 200, acquire, from the image of the captured eye 290, surrounding information 280 formed on the cornea 295, and provide various functions related to the surrounding information.

Figure 3:
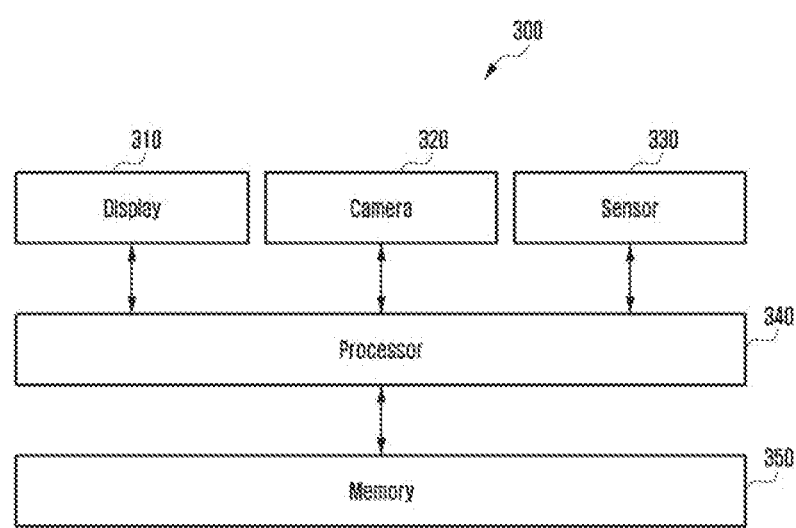
FIG. 3 is a block diagram illustrating a configuration of an electronic device according to an embodiment.

FIG. 3 is a block diagram illustrating a configuration of an electronic device according to an embodiment.

Referring to FIG. 3, the electronic device 300 may include a display 310, a camera 320, a sensor 330, a processor 340, and a memory 350, and some of the illustrated elements may be omitted or substituted with other elements. The electronic device 300 may include at least some of the elements and/or functions of the electronic device 101 of FIG. 1.

The electronic device 300 may receive the respective elements within a housing, and an element (e.g., the display 310) configured to output light to the outside and/or an element (e.g., the camera 320) configured to receive external light may have a part exposed to the outside of the housing.

According to an embodiment, the display 310 may display an image, and may be implemented by one of various types of displays, including a liquid crystal display (LCD), an organic light-emitting diode (OLED) display, and the like. The display 310 may include at least some of the elements and/or functions of the display apparatus 160 of FIG. 1. The display 310 may be exposed to the outside through a part (e.g., a black matrix (BM) area of the front surface) of the housing of the electronic device 300.

The display 310 may be a touch-screen display, and may detect a touch by a user's finger (or another body part) or a stylus pen, or a hovering input (or a proximity touch input).

According to an embodiment, the camera 320 may acquire external image data. The camera 320 may acquire image data by using various types of image sensors, including a charge-coupled device (CCD), a complementary metal-oxide-semiconductor (CMOS), and the like. The electronic device may have at least one camera disposed on the front surface and/or rear surface of the housing, and hereinafter, image data including a region of the user's eyes may be acquired by using a front camera, unless described otherwise herein.

According to an embodiment, the memory 350 may include a known volatile memory and a known non-volatile memory, and a specific implementation example of the memory 350 is not limited thereto. The memory 350 may include at least some of the elements and/or functions of the memory of FIG. 1. Further, the memory 350 may store at least a part of the program 140 of FIG. 1.

The memory 350 may be operatively and/or electrically connected to the processor 340, and may store various instructions executable by the processor 340. These instructions may include control commands, including arithmetic and logic operations, data movement, input/output, and the like which can be recognized by the processor 340.

According to an embodiment, the processor 340 may include elements capable of performing an arithmetic operation or data processing related to control over and/or communication by each element of the electronic device 300, and may include at least some of the elements and/or functions of the processor 120 of FIG. 1. The processor 340 may be operatively and/or electrically connected to the internal elements of the electronic device 300, including the display 310, the sensor 330, the memory 350, and the like.

An arithmetic operation function and a data processing function which can be implemented by the processor 340 in the electronic device 300 may not be limited, but in the disclosure, embodiments for acquiring surrounding information formed on the user's cornea and providing a visual feedback on the display 310 by using the acquired surrounding information will be described. Operations of the processor 340 described below may be performed by loading instructions stored in the memory 350.

According to an embodiment, the processor 340 may acquire image data by using an image sensor of the camera 320. In this example, the image data may include a region of eyes of a user, and may include surrounding information (e.g., surrounding information 280 of FIG. 2) formed on a cornea (e.g., the cornea 295 of FIG. 2) of one or both eyes of the user. The electronic device 300 may have multiple cameras 320 arranged on the front surface and rear surface of the housing thereof, and may acquire image data including the region of the eyes by using the camera 320 disposed on the front surface.

According to an embodiment, the processor 340 may extract, from the acquired image data, a region of the eyes of the user. A method for extracting a region of eyes of a user by the processor 340 is not limited, but for example, the processor 340 may extract the region of the eyes from the image data by using various algorithms, including a Viola-Jones detection algorithm, a non-skin detection algorithm, and the like. The method for extracting a region of eyes by the processor 340 will be described in more detail with reference to FIG. 5.

According to various embodiments, the processor 340 may extract a corneal region from the extracted region of the eyes of the user. Since the cornea reflects at least some of light rays, an image of external information may be projected onto the cornea, and since an image of information having an angle of view wider than a viewing angle, at which the user fixes his or her eyes, is projected onto the cornea, an image of an area at which the user does not stare may also be formed on the cornea.

According to an embodiment, the processor 340 may extract, from the detected region of the eye, a pupil located at the center of the eye, and may extract a corneal region formed in an elliptical shape with the pupil as the center. A method for extracting a corneal region by the processor 340 will be described in more detail with reference to FIG. 6.

According to an embodiment, the processor 340 may acquire image information formed in the corneal region (or a corneal image). The processor 340 may remove noise from the image information formed in the corneal region. For example, eyelashes of the user may be extended and included in an image of the corneal region, and the processor 340 may remove noise, such as the eyelashes, through pixel analysis as described above.

The processor 340 may acquire surrounding information by removing noise from the image information. The surrounding information may include various objects located in an eye-gaze direction of (i.e., in front of) the user. For example, when the user is staring at the electronic device 300, a corneal image may include a screen of the electronic device 300, and may include various objects, including a human, an obstacle, and the like located in front of the user.

According to an embodiment, the processor 340 may determine an eye-gaze direction (or an eye-gaze position) of the user based on the image data acquired by the camera 320. For example, the processor 340 may determine an eye-gaze direction of the user by using various schemes, including a feature-based gaze estimation, a model-based gaze estimation, an iris tracking using the 3D eye model, and the like.

In an example embodiment, the feature-based gaze estimation corresponds to a method for detecting an eye-gaze direction by using geometrical consideration of a hand-craft feature vector mapped to auxiliary information such as the shape of an eye and an orientation of a face (or head pose).

In an example embodiment, the model-based gaze estimation corresponds to a method for detecting an eye-gaze direction by determining a visual axis and an optical axis based on a three-dimensional (3D) model considering the center and radius of an eyeball.

According to an embodiment, the processor 340 may determine whether to output a visual feedback described below, based on the eye-gaze direction of the user. For example, when the user is staring at the display 310 of the electronic device 300, the processor 340 may output a visual feedback corresponding to the corneal image.

According to an embodiment, the processor 340 may detect a direction of a surrounding light source from the corneal image. The processor 340 may correct distortion occurring in the corneal image.

According to an embodiment, the processor 340 may extract, from the image data acquired by the camera 320, a corneal region of at least one of the user's two eyes. More specifically, the processor 340 may extract, from the image data, a corneal region of at least one of the two eyes, and may acquire surrounding information from each extracted corneal region.

In a case when the processor 340 extracts corneal regions of both of the user's eyes, the processor 340 may combine the two pieces of surrounding information, acquired from the respective corneal regions, into one piece of information. A method for combining surrounding information in at least one corneal image into one piece of information by the processor 340 will be described in more detail with reference to FIG. 8.

According to an embodiment, the processor 340 may recognize at least one object in the surrounding information acquired from the corneal image. Since an image of information having an angle of view wider than a viewing angle, at which the user fixes his or her eyes, is projected from the cornea, even when the user is staring at the electronic device 300, images of various objects located in front of the user may be formed on the cornea.

The processor 340 may recognize an object in the corneal image by using a method for recognizing various objects. A neural network acquired through learning of a related data set may be used to successfully recognize a particular object. Further, context recognition may use only little information to identify a subject of an image. Such a subject may be utilized to distinguish between different objects even when images are similar.

According to an embodiment, in order to improve a recognition rate of an object, the processor 340 may improve a resolution of a corneal image by using various super-resolution algorithms using deep learning.

According to an embodiment, the processor 340 may provide a visual feedback corresponding to the recognized object. Examples of the recognized object may include an obstacle, a human, and the like located in front of the user, and the processor 340 may provide, on the display 310, a visual feedback corresponding to the recognized object. A visual feedback to be output in response to the object recognized in the corneal image may be mapped and stored in the memory 350. According to various embodiments, the processor 340 may provide an audio feedback via a speaker or a haptic feedback together with or separately from a visual feedback.

According to an embodiment, a visual feedback may include an image of the recognized object and/or a predetermined image. Examples of the visual feedback provided by the electronic device 300 will be described in detail with reference to FIG. 10A and FIG. 10B.

According to an embodiment, when the recognized object is a predetermined type of object (e.g., an obstacle), the processor 340 may provide an alarm for danger recognition as the visual feedback. Accordingly, even in a situation where the user is staring at the display 310 of the electronic device 300, the visual feedback provided on the display 310 allows the user to recognize that an obstacle is located in front of the user.

According to an embodiment, the processor 340 may acquire a movement speed of the electronic device 300 through the sensor 330 (e.g., an acceleration sensor), and may provide an alarm for danger recognition if the current movement speed is greater than or equal to a reference value. For example, if the current movement speed is less than the reference value, no alarm for danger recognition is provided even when an object is recognized. This configuration is for reducing excessive provision of a feedback, since there is little concern about collision with a surrounding obstacle in a stopped state.

According to an embodiment, the processor 340 may acquire location information of the electronic device 300 based on the recognized object, and may provide the location information to a location-based application (e.g., a map application).

According to an embodiment, the electronic device 300 may provide an augmented reality content on the display 310. The augmented reality content may include a real image captured by the camera 320 and a virtual object generated by the electronic device 300. The processor 340 may display a virtual object to be provided to an augmented reality content, based on a corneal image. For example, the processor 340 may acquire, from surrounding information, an ambient brightness and a direction of a light source, and may determine a brightness of a virtual object and a bright region and a shadow region thereof based on the ambient brightness and the direction of the light source.

According to an embodiment, the processor 340 may recognize at least one text from surrounding information, and may provide information related to the text.

Figure 4:
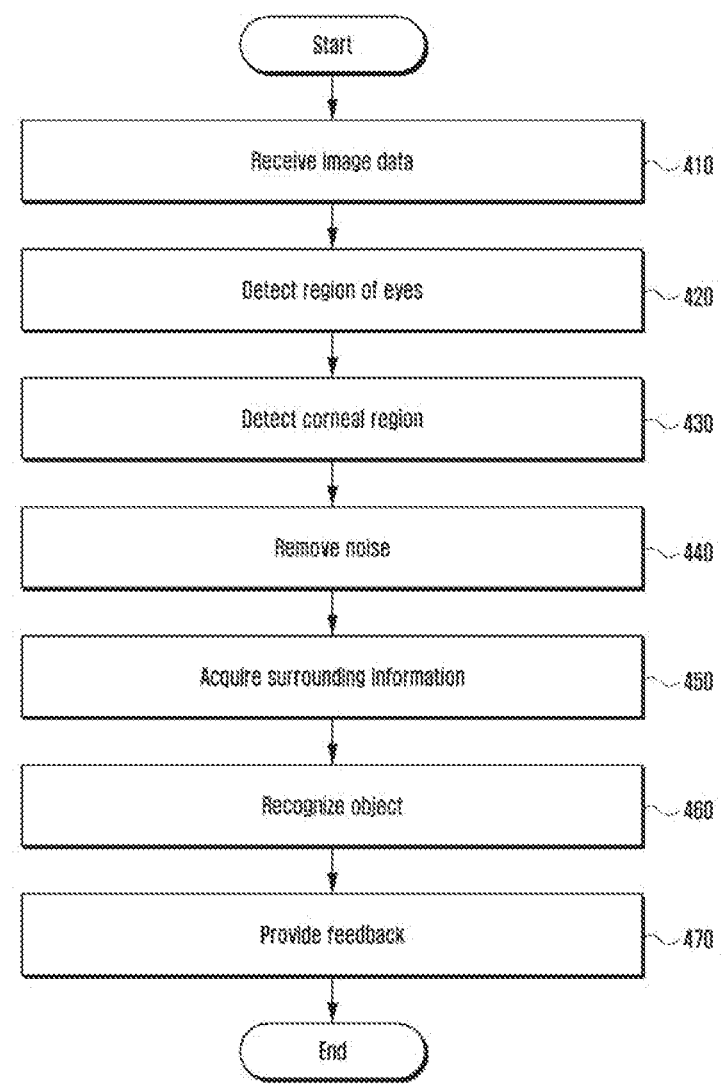
FIG. 4 is a flowchart illustrating a method for providing a function by an electronic device according to an embodiment.

FIG. 4 is a flowchart illustrating a method for providing a function by an electronic device according to an embodiment.

The illustrated method may be performed by the electronic device 101 of FIG. 1 and/or the electronic device 300 of FIG. 3.

In operation 410, the electronic device may acquire image data by using a camera (e.g., the camera 320 of FIG. 3). The electronic device may acquire image data including a region of eyes of a user by using the camera disposed on the front surface of the housing.

In operation 420, the electronic device (e.g., the processor 340 of FIG. 3) may extract the region of the eyes of the user from the acquired image data.

In operation 430, the electronic device may extract a corneal region from the region of the eyes of the user. Since the cornea reflects at least some of incident light rays, an image of external information may be projected from the cornea, and since an image of information having an angle of view wider than a viewing angle at which the user fixes his or her eyes is projected from the cornea, an image of an area at which the user does not stare may also be formed on the cornea.

In operation 440, the electronic device may remove noise from an image formed in the corneal region.

In operation 450, the electronic device may acquire surrounding information from the image formed in the corneal region. The surrounding information may be obtained by removing, from a corneal image, noise (e.g., eyelashes) as in operation 440 and an image of the electronic device.

In operation 460, the electronic device may recognize at least one object (i.e., a real-world object) from the surrounding information. The electronic device may previously store objects to be mapped to a visual feedback when the electronic device outputs the visual feedback to a memory (e.g., the memory 350 of FIG. 3), and may recognize an object included in the stored information.

In operation 470, the electronic device may provide a visual feedback corresponding to the recognized object, on a display (e.g., the display 310 of FIG. 3). In an example, the visual feedback may include an image of the recognized object and/or a predetermined image. The electronic device may provide an audio feedback via a speaker or a haptic feedback together with or separately from the visual feedback.

Figure 5:
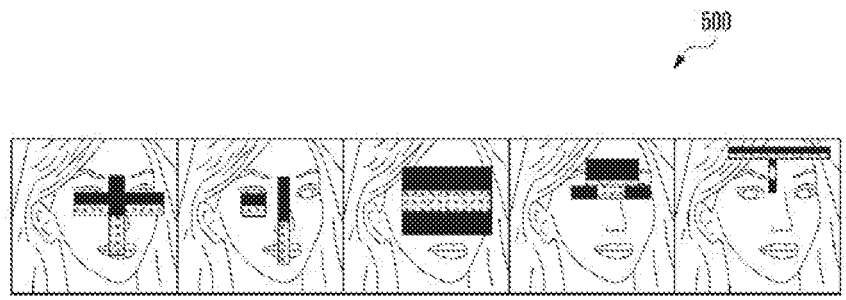
FIG. 5 is a view illustrating an example of a method for extracting a region of eyes of a user from an acquired image.

FIG. 5 is a view illustrating an example of a method for extracting a region of eyes of a user from an acquired image.

According to various embodiments, a processor (e.g., the processor 340 of FIG. 3) may extract a region of eyes of a user from image data acquired by a camera (e.g., the camera 320 of FIG. 3).

The method for extracting a region of eyes of a user by the processor is not limited, but may utilize, for example, a Viola-Jones detection algorithm.

The Viola-Jones detection algorithm is used to detect an object in image data based on a Haar-like feature and AdaBoost.

For example, in a learning stage, the Viola-Jones detection algorithm may measure importance levels of respective features from a learning image (e.g., a model image used for learning) by using multiple Haar-like features, may perform learning through an AdaBoost method by using only the highest ranking features among the measured importance levels, and thus may perform a task of selecting only the most important features. Then, in a test stage, the Viola-Jones detection algorithm may apply a test image as input to a cascade structure of the features, pre-selected in the learning stage, so as to measure a feature value, may perform classification based on the measured feature value, and thus may perform a task of detecting an object from a given image.

FIG. 5 illustrates various types of Haar-like features 500 used to find a region of the eyes from an image of the user.

As another method for extracting a region of eyes of a user, a non-skin detection algorithm may be used. For example, a region of the eyes may be a non-skin region in a face region. Thus, a skin region may be detected and then the region of the eyes may be detected in the non-skin region.

Figure 6:
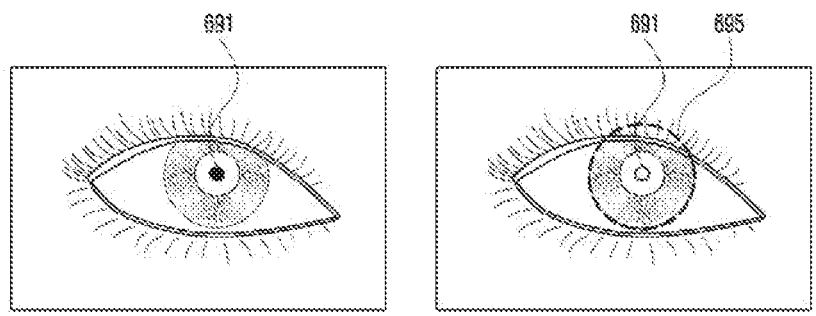
FIG. 6 is a view illustrating an example of a method for extracting a corneal region of an eye from an acquired image.

FIG. 6 is a view illustrating an example of a method for extracting a corneal region of an eye from an acquired image.

According to an embodiment, a processor (e.g., the processor 340 of FIG. 3) may detect a corneal region of an eye by using image data of a region of eyes of a user among image data. The processor may first detect a pupil region 691 from image data of the eyes, and may then detect the corneal region 695 by using an ellipse fitting method.

When the image data includes an eye and a surrounding region of the eye, a gray level of the pupil region 691 may be close to that of the darkest pixel in an image. The processor may configure, as a threshold, a maximum value (or a gray level of the darkest pixel in an image) among gray levels of pixels in the pupil region 691. The processor may convert and process a binary image generated with reference to the threshold (thresholded binary image), and thus may remove, from the thresholded binary image, a region smaller than the pupil region 691. The processor may calculate a center of the remaining pixels except for the region removed from the thresholded binary image, and may determine that a corresponding central region is a center of the pupil 691.

A method for detecting the pupil region 691 is not limited to the above description.

The processor may extract the corneal region 695 by analyzing an ellipse including the center of the pupil 691.

The corneal region 695 may be detected by an ellipse detector for finding ellipse parameters ($c_u$, $c_v$, $r_{max}$, $r_{min}$, $\varphi$) which maximize a response to an operator applied to an image I(u, v).

Equation 1 below defines a formula of a filter used to detect the corneal region 695.

$$e = \max_{(c_u, c_v, r_{max}, r_{min}, \varphi)} \left| g_\sigma(r_{max}) * \frac{\partial}{\partial r_{max}} \oint_e I(u, v) ds + g_\sigma(r_{min}) * \frac{\partial}{\partial r_{min}} \oint_e I(u, v) ds \right| \quad \text{Equation 1}$$

In Equation 1, ($c_u$, $c_v$) may represent a center point of the cornea (or pupil), $r_{max}$ and $r_{min}$ may represent a maximum value and a minimum value of a radius of an ellipse, respectively, and $\varphi$ may represent a rotation angle of an ellipse.

A response of the filter may output a region of an arc of the ellipse.

The processor may detect, as the corneal region 695, the ellipse identified based on the response of the filter.

A method for detecting the corneal region 695 is not limited to the above description.

Figure 7:
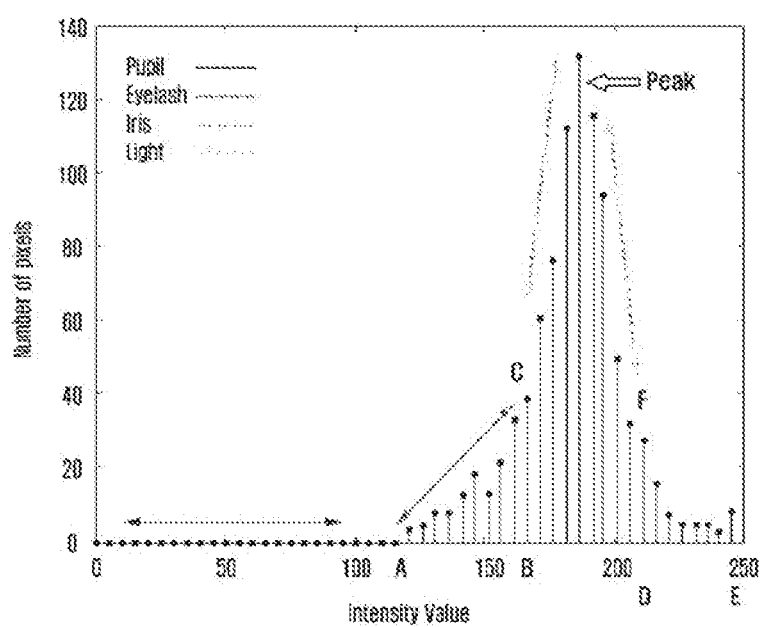
FIG. 7 illustrates a histogram of an acquired corneal image.

FIG. 7 illustrates a histogram of an acquired image.

According to an embodiment, a processor (e.g., the processor 340 of FIG. 3) may acquire image data of a corneal region (e.g., the corneal region 695 of FIG. 6) from image data, and may remove noise. For example, a corneal image formed in the corneal region may include not only surrounding information located in front of a user but also the user's eyelashes, and since the user's eyelashes do not correspond to an image of a surrounding area formed on the cornea, it is necessary to remove the user's eyelashes. Further, as illustrated in FIG. 6, the corneal region defined as an elliptical region may also include a part of an eyelid that does not correspond of the surrounding area.

FIG. 7 illustrates a histogram of a normalized corneal image. In the histogram, a range of 0 to A may represent a pupil region, a range of A to B may represent an eyelash region, and a range of D to E may represent an eyelid region or a region of light reflected from the eyelid.

A processor may remove noise corresponding to the eyelash region and the eyelid region through histogram analysis.

Figure 8:
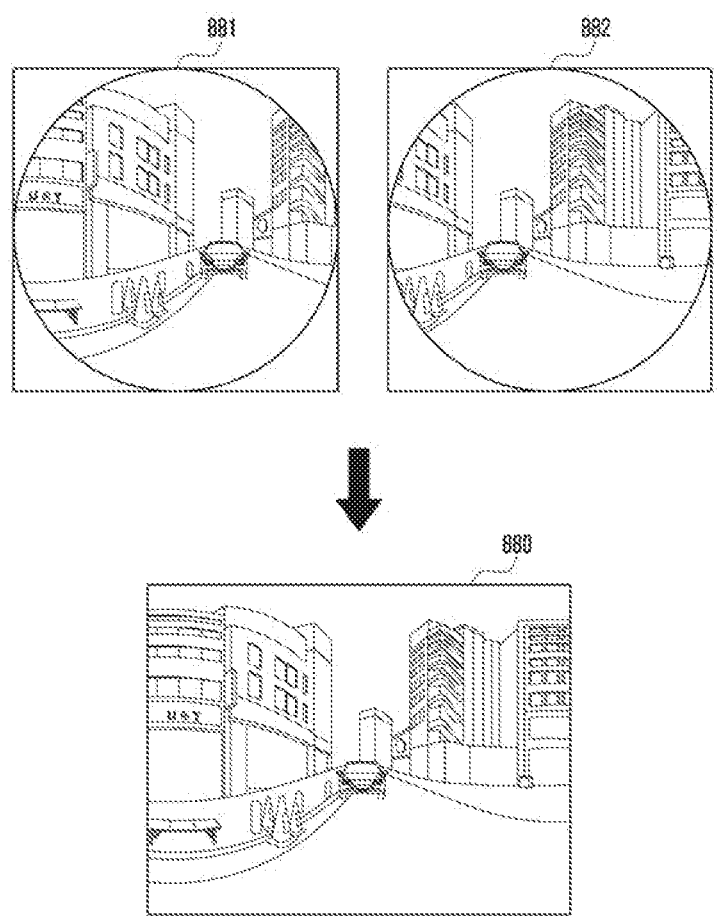
FIG. 8 a view illustrating an example of a method for forming a panorama image by combining images formed on corneas of both eyes.

FIG. 8 illustrates an example of a method for forming a panorama image by combining images formed on corneas of both eyes (i.e., a first image reflected by a first cornea and a second image reflected by a second cornea).

According to an embodiment, a processor (e.g., the processor 340 of FIG. 3) may extract a corneal region (e.g., the corneal region 695 of FIG. 6) of at least one of a user's two eyes, from image data acquired by a camera (e.g., the camera 320 of FIG. 3). More specifically, the processor may extract, from the image data, a corneal region of at least one of the two eyes, and may acquire surrounding information from each extracted corneal region.

According to an embodiment, in a case when the processor extracts the corneal regions of both of the two eyes, the processor may combine the two pieces of surrounding information 881 and 882, acquired from the respective corneal regions, into one piece of information.

For example, when image data includes a result of capturing of the user's two eyes, the two eyes and the camera may be considered to be a catadioptric stereo system. The processor may determine a relative orientation between the corneas of the both eyes and the camera, and may determine positions of the respective corneal images 881 and 882. The acquired corneal image 881 of the left eye may have an epipolar curve corresponding to the corneal image 882 of the right eye. The processor may generate one piece of surrounding information 880 by combining the both images based on the epipolar curve of the corneal image 881 of the left eye and the corneal image 882 of the right eye.

According to an embodiment, the processor may combine pieces of information of multiple chronologically consecutive corneal images in order to acquire surrounding information of a wide angle of view.

For example, when the user moves his or her eye-gaze, different images of the surroundings may be acquired from corneal regions in respective frames. The processor may extract corneal regions and may acquire pieces of surrounding information, from sequentially-acquired multiple frames (i.e., at a first time and a second time different from the first time), and may combine the pieces of surrounding information in the respective frames, so as to acquire surrounding information of a wide angle of view.

According to the use of multiple spherical panorama images, distortion in an overlapping part between spherical panorama images can be minimized. Pixels of each spherical panorama may be calculated from 3D coordinates and an orientation of a cornea, and the respective panorama images may be combined using parameters acquired from a result of the calculation.

Figure 9:
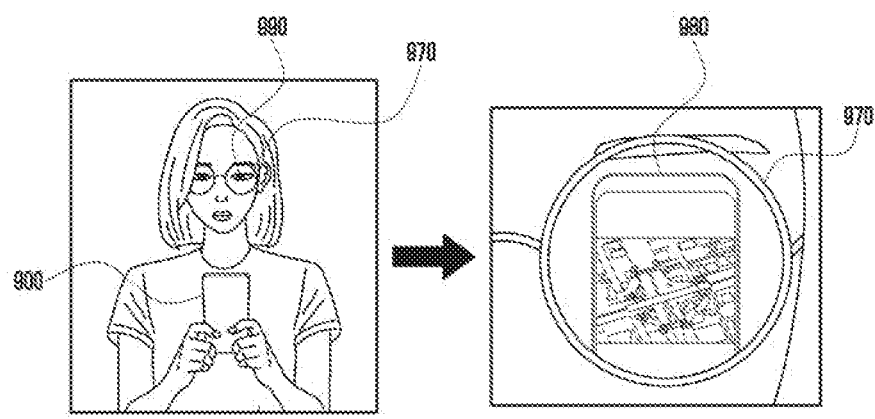
FIG. 9 is a view illustrating an example of a method for acquiring an image formed on glasses when a user wears the glasses.

FIG. 9 is a view illustrating an example of a method for acquiring an image formed on glasses when a user wears the glasses.

According to an embodiment, when a user wears an accessory 970, such as glasses, goggles, or a helmet, and stares at an electronic device 900, a camera of the electronic device 900 may acquire an image formed not on the user's eye 990 but on the accessory 970 worn by the user. When the user wears the accessory 970, an image of the eye may not be acquired by a front camera of the electronic device, and thus a corneal image may not be acquired, but surrounding information may be formed as an image on the accessory 970.

The processor may acquire surrounding information by using an image 980 formed on the accessory 970, and may extract an object from the surrounding information.

Figure 10A:
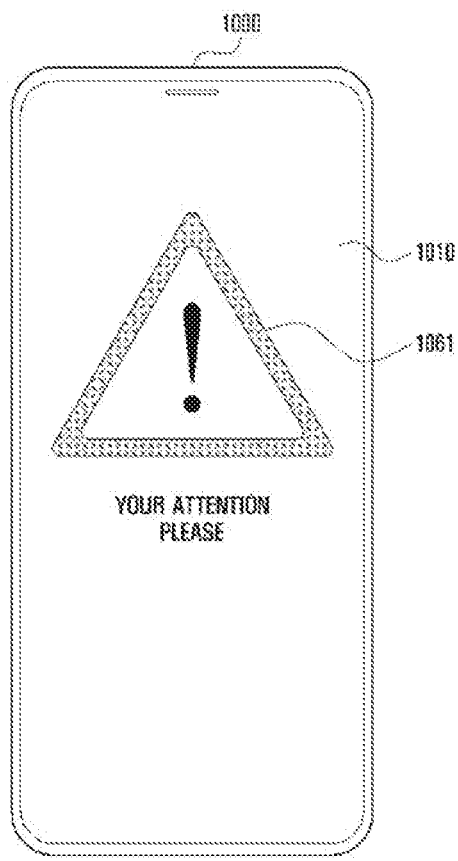
FIG. 10A is a view illustrating a visual feedback provided by an electronic device according to an embodiment.
Figure 10B:
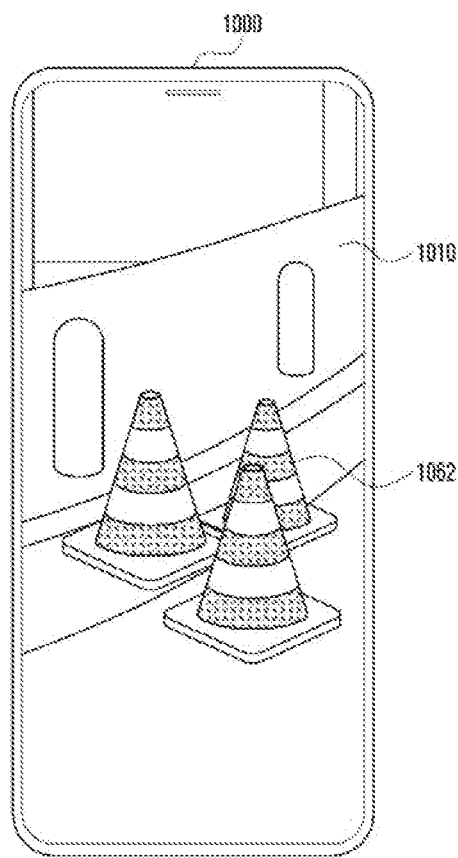
FIG. 10B is a view illustrating a visual feedback provided by an electronic device according to an embodiment.

FIG. 10A is a view illustrating a visual feedback provided by an electronic device according to an embodiment, and FIG. 10B is a view illustrating a visual feedback provided by an electronic device according to an embodiment.

According to an embodiment, a processor (e.g., the processor 340 of FIG. 3) may recognize at least one object in surrounding information acquired from a corneal region, and may provide, on a display 1010, a visual feedback corresponding to the recognized object.

According to an embodiment, a visual feedback may be a predetermined image 1061 which requests a user to pay attention to surrounding information. Referring to FIG. 10A, the image 1061 provided as a visual feedback may include an image which requests the user's attention and text information.

In a situation where the user stares at the display 1010 of the electronic device 1000 and accordingly, fails to pay attention to a surrounding object (e.g., an obstacle or a human), the above-described visual feedback 1061 may be provided, and thus allows the user to avert his or her eyes so as to recognize the circumstances surrounding the user.

Referring to FIG. 10B, a visual feedback may be an image 1062 of a recognized object. For example, if an obstacle is located in front of the user in a situation where the user is staring at the display 1010 of the electronic device 1000 while the user moves, an image of the obstacle may be formed on the user's cornea. The processor may display the image 1062 of the acquired object (e.g., an obstacle) on the display 1010, and thus allows the user to immediately recognize the surrounding object even in a situation where the user is staring at the electronic device 1000.

The processor may display a visual feedback including the image 1062 of the object, in one area of a screen of an application currently being executed, such as a pop-up window, or may display the same at an upper position (e.g., an overlaid position) of a screen of the application in a translucent layer.

FIG. 11 to FIG. 17 are views each illustrating an example in which an electronic device provides a user with various functions by using an image formed on a cornea.

FIG. 11 illustrates a situation in which the user is staring at the electronic device while the user moves (or walks). The user is staring at the electronic device 1100 as described above, and thus may not recognize that an obstacle 1181 existing around the user is located on a movement path.

According to an embodiment, a processor may acquire surrounding information 1180 from a corneal image, and when an object in the surrounding information 1180 is detected as a predetermined dangerous object, for example, a human, a streetlamp, a crack in a road, or a hole, may provide a visual feedback 1160 to the user on a display 1110. The visual feedback 1160 may include, for example, text or image information for notifying that an obstacle is located in front of the user. According to an embodiment, the processor may display, on the display, an image of an object acquired from a corneal image.

According to an embodiment, the electronic device may store, in a memory, an image to be displayed in response to an object acquired from a corneal image.

According to an embodiment, the electronic device may detect the user's movement by using at least one sensor (e.g., the sensor 330 of FIG. 3) or a rear camera, and when an obstacle is recognized while the user's movement speed is greater than or equal to a predetermined speed, may provide an alarm (or a visual feedback 1160) for danger recognition. The alarm or visual feedback 1160 may not be provided when the user's movement speed is less than the predetermined speed even when the obstacle is recognized. This configuration is for minimizing stress caused by an alarm while the electronic device is used, since danger due to an obstacle is not significant in a stopped situation.

According to an embodiment, the electronic device may detect the user's eye-gaze by using an image acquired through a front camera, and when it is detected that the user's eye-gaze is staring at the display 1110, may provide an alarm 1160 for danger recognition.

According to an embodiment, when the user is staring at a particular point (e.g., a navigation display) or the like for a long time while driving, the electronic device may detect a situation, which is not expected, by using a corneal image, and may provide a feedback to the user. For example, when the user is staring at a navigation display of a vehicle driven by the user, the processor may detect, from a corneal image, a traffic light, a vehicle, and the like, and may provide the user with an alarm via the display or a sound alarm via a speaker.

The processor may further acquire an image of a rear view mirror by using a camera, may analyze objects in a corneal image and the image of the rear view mirror, and thus may recognize a traffic situation.

Figure 12:
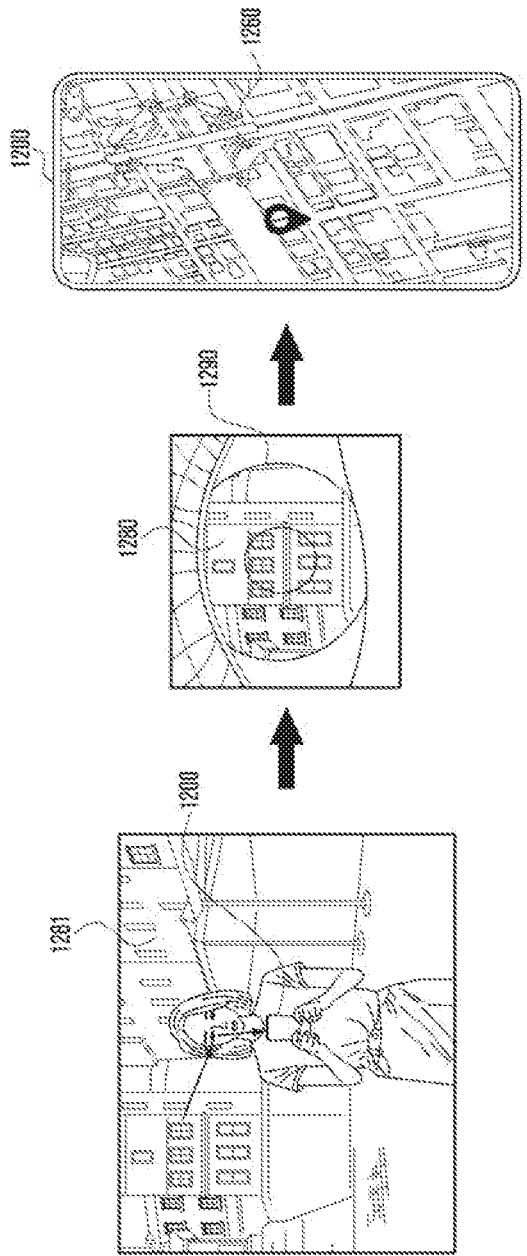

FIG. 12 illustrates an embodiment for providing a location-based service by using a corneal image.

An electronic device 1200 may execute an application for providing various location-based services (e.g., a map application). A location-based application may acquire a current location of the electronic device, and may provide various pieces of information based on the current location.

According to an embodiment, the processor may recognize an object in surrounding information 1280 acquired from a corneal image 1290, and may determine a current location of the electronic device based on the recognized object.

For example, when text such as an address or a building name indicating particular location information, or a landmark building 1281 is recognized from an image formed on the user's eye, the electronic device may identify a location of the corresponding object. The electronic device may provide the current location through a location-based application.

The electronic device may also utilize a corneal image for indoor positioning.

Figure 13:
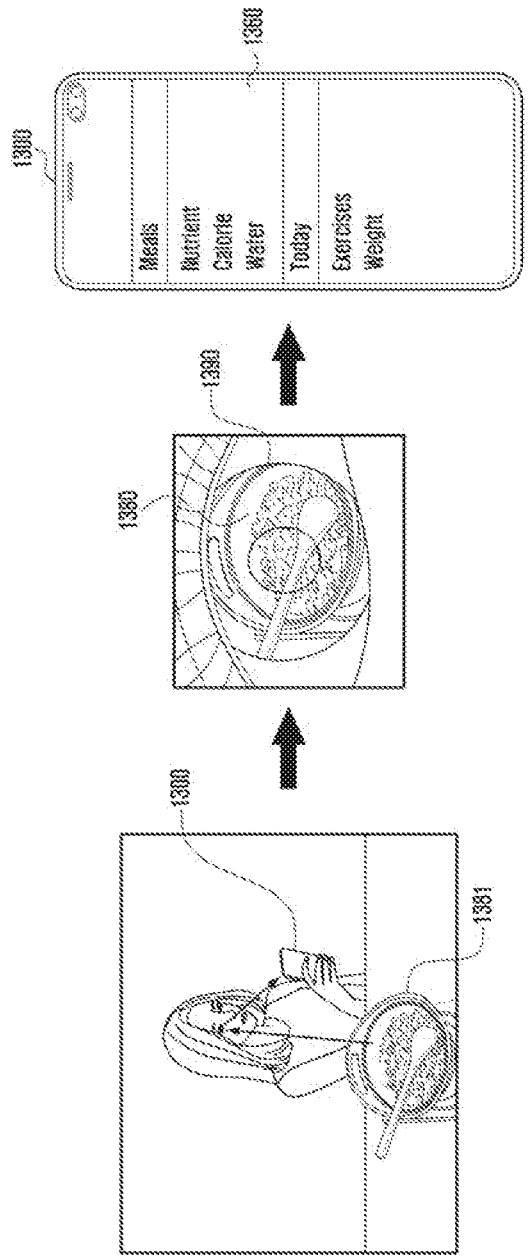

FIG. 13 illustrates an embodiment for providing information of a surrounding object by using a corneal image.

Referring to FIG. 13, a user may use an electronic device 1300 while the user has a meal. An image of food 1380 may be formed on the user's eye while the user is staring at the electronic device 1300, and the electronic device 1300 may acquire a food object 1381 from a corneal image 1390 formed on the cornea of the user.

The electronic device 1300 may provide information related to the recognized food 1381 as a visual feedback 1360 on a display. For example, the electronic device 1300 may identify a profile (e.g., nutrients and calorie content) of the corresponding food, may immediately display the same on the display, and may list pieces of information, including a type, an amount, nutrients, and the like of the food eaten by the user by using an application, so as to provide various services.

Figure 14:
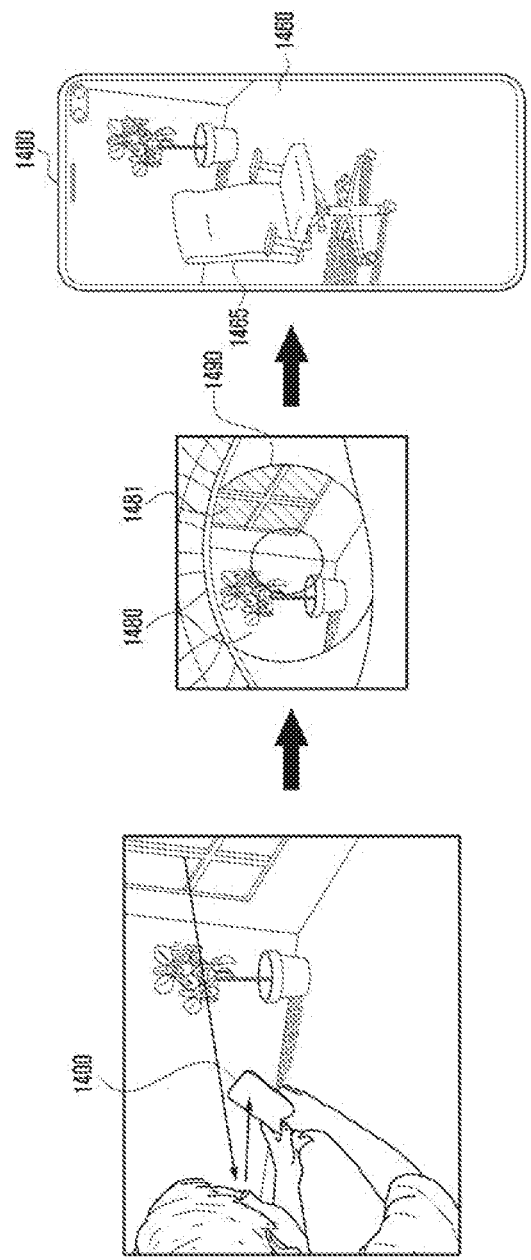

FIG. 14 illustrates an embodiment for recognizing an ambient brightness by utilizing a corneal image.

According to an embodiment, a corneal image may be utilized to provide augmented reality.

Referring to FIG. 14, an electronic device 1400 may acquire an ambient brightness and a direction of a light source based on a corneal image 1490 including surrounding information 1480 formed on a cornea of a user. When an ambient light source 1481 is projected onto the user's eyes, an image due to the light source may be formed in a corneal image, and the electronic device 1400 may recognize an ambient brightness and a direction of the light source by analyzing the corneal image.

Based on the brightness and the direction of the light source, the electronic device may determine a brightness of an augmented reality object (i.e., an augmented reality element) and a shadow position thereof when an augmented reality content 1460 is provided. For example, referring to FIG. 14, when a chair 1465 is displayed as an augmented reality object in an empty space inside a room, the electronic device may recognize, from a corneal image, a brightness and a direction of a light source inside the room, and may determine a brightness and a shadow position of the chair 1465 which is an augmented reality object.

Figure 15:
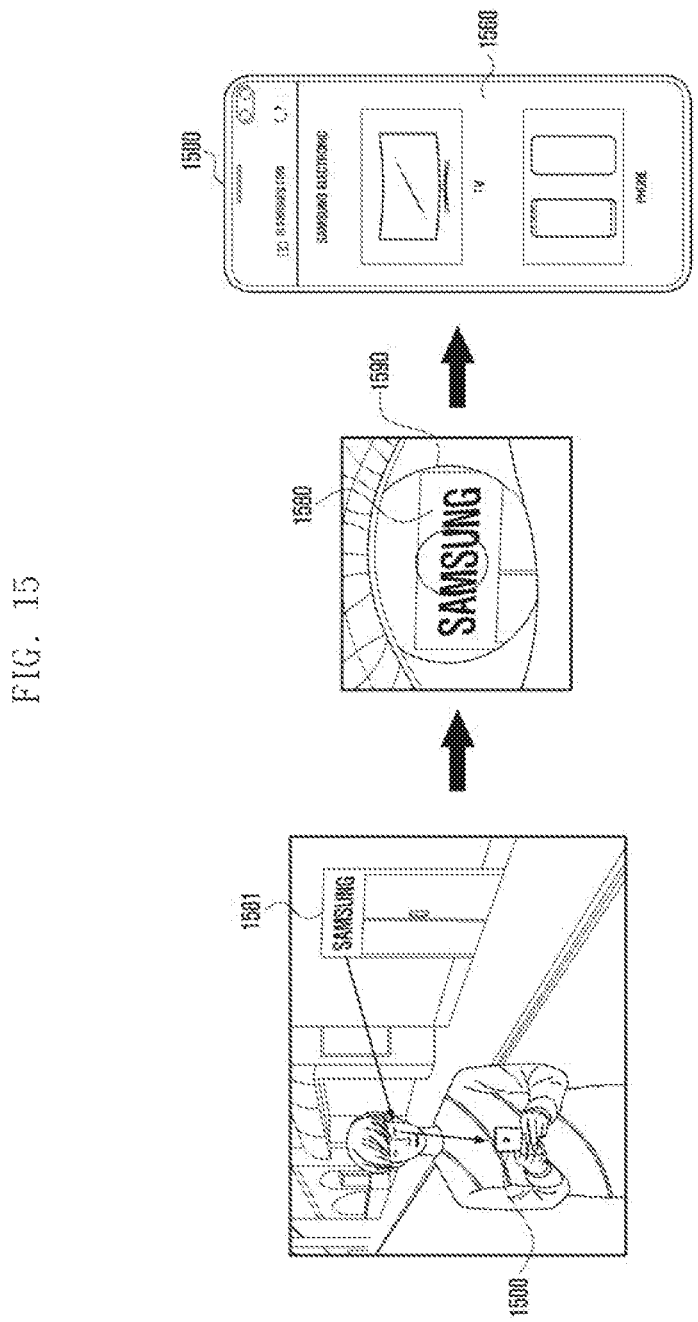

FIG. 15 illustrates an embodiment for recognizing surrounding text by using a corneal image.

According to an embodiment, an electronic device 1500 may recognize at least one text 1581 in surrounding information 1580 acquired from a corneal image 1590, and may provide information related to the text 1581.

Referring to FIG. 15, a signboard of a neighboring shop may be formed as an image in the corneal image 1590, and the electronic device 1500 may recognize text of the corneal image 1590 so as to provide information, an advertisement, and the like related to the corresponding shop.

When a name and the like of a particular product is recognized from the corneal image 1590, the electronic device 1500 may provide visual feedback 1560 including personalized information or a recommended event relating to the corresponding product or a related product.

FIG. 16 illustrates an embodiment for recognizing an eye-gaze of another human by using a corneal image.

Referring to FIG. 16, when a user is absorbed in a game, a multimedia application, and the like by using an electronic device 1600, the user may neglect to recognize a surrounding environment.

The electronic device 1600 may recognize an eye-gaze 1680 of another human from a corneal image 1690, and when it is determined that another human 1681 is staring at the user of the electronic device 1600, the electronic device 1600 may provide, on a display, an alarm 1660 for warning the user of this situation. The electronic device 1600 may provide an alarm 1660 in a pop-up window on a screen of an application being executed.

FIG. 17 illustrates an embodiment for guiding a user so as to execute another function by using a corneal image.

Referring to FIG. 17, an electronic device 1700 may recognize that a user is now on board an airplane, by using a corneal image 1790. For example, surrounding information 1780 including an object 1781, such as an window of the airplane, may be included as an image in corneal image 1790.

In an example, the electronic device 1700 may provide a visual feedback 1760 for guiding the user so as to execute a necessary function according to a current location and state of the user. For example, when the electronic device 1700 is not operating in an airplane mode, the electronic device 1700 may provide the alarm 1760 for guiding the user so as to execute the airplane mode.

The electronic device may collect and store a current state and surrounding information by using the corneal image. In an example, the electronic device may propose to the user that the user subsequently executes the same function in the same environment. In other words, the electronic device may associate a function performed by the user with the surrounding information occurring at the time that the user performs the function and may then recommend the same function to be performed in the future when similar surrounding information is recognized. For example, the electronic device may: recognize, from the corneal image, that a current location of the user is within the airplane; when the user executes the airplane mode, map the current location (in the airplane) to an executed function (airplane mode); and store the current location mapped to the executed function in the memory. Then, when a pre-stored location or situation is recognized from the corneal image, the electronic device may provide a recommendation to the user based on the previously executed function.

An electronic device according to an embodiment may include: a camera; a display; a memory; and a processor configured to be operatively connected to the camera, the display, and the memory, wherein the memory is configured to store instructions that, when executed, cause the processor to: receive image data including at least a part of a user's body acquired by the camera; extract a corneal region of an eye from the image data; acquire surrounding information formed in the extracted corneal region; recognize at least one object in the surrounding information; and provide, on the display, a visual feedback corresponding to the recognized object.

According to an embodiment, the instructions may include instructions configured to cause the processor to display, on the display, at least one of an image of the recognized object and a predetermined image.

According to an embodiment, the instructions may include instructions configured to cause the processor to provide, as the visual feedback, an alarm for danger recognition, when the recognized object corresponds to a predetermined type of object.

According to an embodiment, the electronic device may further include a sensor configured to measure a movement speed of the electronic device, wherein the instructions include instructions configured to cause the processor to provide the alarm for the danger recognition, when the movement speed measured by the sensor is greater than or equal to a predetermined speed.

According to an embodiment, the instructions may include instructions configured to cause the processor to: acquire location information of the electronic device based on the recognized object; and provide the acquired location information to an executed location-based application.

According to an embodiment, the instructions may include instructions configured to cause the processor to: display an augmented reality content on the display; and display the visual feedback in the augmented reality content.

According to an embodiment, the instructions may include instructions configured to cause the processor to acquire an ambient brightness from the surrounding information.

According to an embodiment, the instructions may include instructions configured to cause the processor to: recognize at least one text in the surrounding information; and provide information related to the text.

According to an embodiment, the camera may be configured to be disposed on a front surface of a housing of the electronic device.

According to an embodiment, the instructions may include instructions configured to cause the processor to extract, from the received image data, a corneal region of at least one eye of the user.

According to an embodiment, the instructions may include instructions configured to cause the processor to:

detect an eye-gaze position of the user from the image data; and provide the visual feedback when the eye-gaze position is directed to at least a part of the electronic device.

A method for providing a function by an electronic device according to various embodiments may include: acquiring image data including at least a part of a user's body by using a camera; extracting a corneal region of an eye from the image data; acquiring surrounding information formed in the extracted corneal region; recognizing at least one object in the surrounding information; and providing, on a display, a visual feedback corresponding to the recognized object.

According to an embodiment, the providing of the visual feedback may include displaying, on the display, at least one of an image of the recognized object and a predetermined image.

According to an embodiment, the providing of the visual feedback may include providing, as the visual feedback, an alarm for danger recognition, when the recognized object corresponds to a predetermined type of object.

According to an embodiment, the method may further include measuring a movement speed of the electronic device by using a sensor, wherein the providing of the visual feedback includes providing the alarm for the danger recognition, when the movement speed measured by the sensor is greater than or equal to a predetermined speed.

According to an embodiment, the providing of the visual feedback may include: acquiring location information of the electronic device based on the recognized object; and providing the acquired location information to an executed location-based application.

According to an embodiment, the acquiring of the surrounding information may include acquiring an ambient brightness from the surrounding information.

According to an embodiment, the providing of the visual feedback may include: recognizing at least one text in the surrounding information; and providing information related to the text.

According to an embodiment, the extracting of the corneal region of the eye may include extracting, from the received image data, a corneal region of at least one eye of the user.

According to an embodiment, the method may further include detecting an eye-gaze position of the user from the image data, wherein the providing of the visual feedback includes providing the visual feedback when the eye-gaze position is directed to at least a part of the electronic device.

What is claimed is:

1. An electronic device comprising:
   a camera;
   a display;
   a memory; and
   a processor configured to be operatively connected to the camera, the display, and the memory,
   wherein the memory is configured to store instructions that, when executed, cause the processor to:
      receive image data comprising a first image, acquired by the camera, of at least a part of a body of a user;
      extract a corneal region of an eye from the image data;
      acquire surrounding information formed in the extracted corneal region;
      recognize at least one object in the surrounding information other than the electronic device; and
      provide, on the display, a visual feedback corresponding to the recognized at least one object, the visual feedback comprising a second image of the recognized at least one object reflected by the corneal region of the eye.

2. The electronic device of claim 1, wherein the instructions, when executed, further cause the processor to display, on the display, a predetermined image.

3. The electronic device of claim 1, wherein the instructions, when executed, further cause the processor to provide, as the visual feedback, an alarm for danger recognition, when the recognized at least one object corresponds to a predetermined type of object.

4. The electronic device of claim 3, further comprising a sensor configured to measure a movement speed of the electronic device,
   wherein the instructions, when executed, further cause the processor to provide the alarm for the danger recognition, when the movement speed measured by the sensor is greater than or equal to a predetermined speed.

5. The electronic device of claim 1, wherein the instructions, when executed, further cause the processor to:
   acquire location information of the electronic device based on the recognized at least one object; and
   provide the acquired location information to an executed location-based application.

6. The electronic device of claim 1, wherein the instructions, when executed, further cause the processor to:
   display an augmented reality content on the display; and
   display the visual feedback in the augmented reality content.

7. The electronic device of claim 1, wherein the instructions, when executed, further cause the processor to acquire an ambient brightness from the surrounding information.

8. The electronic device of claim 1, wherein the instructions, when executed, further cause the processor to:
   recognize at least one text in the surrounding information; and
   provide information related to the at least one text.

9. The electronic device of claim 1, wherein the camera is disposed on a front surface of a housing of the electronic device.

10. The electronic device of claim 1, wherein the extracted corneal region is of at least one eye of the user.

11. The electronic device of claim 1, wherein the instructions, when executed, further cause the processor to:
   detect an eye-gaze position of the user from the image data; and
   provide the visual feedback when the eye-gaze position is directed to at least a part of the electronic device.

12. A method for providing a function by an electronic device, the method comprising:
   acquiring image data comprising a first image, acquired using a camera, of at least a part of a body of a user;
   extracting a corneal region of an eye from the image data;
   acquiring surrounding information formed in the extracted corneal region;
   recognizing at least one object in the surrounding information other than the electronic device; and
   providing, on a display, a visual feedback corresponding to the recognized at least one object,
   wherein the visual feedback comprises a second image of the recognized at least one object reflected by the corneal region of the eye.

13. The method of claim 12, wherein the providing of the visual feedback comprises providing, as the visual feedback, an alarm for danger recognition, when the recognized at least one object corresponds to a predetermined type of object.

14. The method of claim 12, wherein the providing of the visual feedback comprises:

acquiring location information of the electronic device based on the recognized at least one object; and providing the acquired location information to an executed location-based application.

15. The method of claim 12, wherein the providing of the visual feedback comprises:

recognizing at least one text in the surrounding information; and providing information related to the at least one text.

16. The method of claim 12, further comprising detecting an eye-gaze position of the user from the image data, wherein the providing of the visual feedback comprises providing the visual feedback when the eye-gaze position is directed to at least a part of the electronic device.

17. An electronic device comprising:

a camera;

a display;

a processor; and a memory configured to store instructions that, when executed, cause the processor to:

receive, from the camera, a first image reflected by a first cornea of a user viewing the display, the first image comprising a first sub-image of a real-world object other than the electronic device located near the user; and provide, on the display, a visual feedback comprising the first sub-image of the real-world object reflected by the corneal region of the eye.

18. The electronic device of claim 17, wherein the first image further comprises a second sub-image of a light source located near the user, wherein the instructions, when executed, further cause the processor to acquire an ambient brightness near the user based on the light source, and wherein the visual feedback comprises an augmented reality element added, based on the ambient brightness, to a displayed image of the real-world object.

19. The electronic device of claim 17, wherein the instructions, when executed, further cause the processor to:

receive, from the camera, a second image reflected by a second cornea of the user, the second image comprising the first sub-image of the real-world object; and generate a panorama image based on the first image and the second image and having a wider angle of view than angles of view of the first image and the second image.

20. The electronic device of claim 17, wherein the first image is captured by the camera at a first time, wherein the instructions, when executed, further cause the processor to receive, from the camera, a second image reflected at a second time by the first cornea of the user, and wherein the second time is different from the first time.

* * * * *